Jan. 27, 1931. A. N. STANTON 1,790,080
METHOD OF SEISMOLOGICAL RESEARCH
Filed Dec. 26, 1928 2 Sheets-Sheet 1
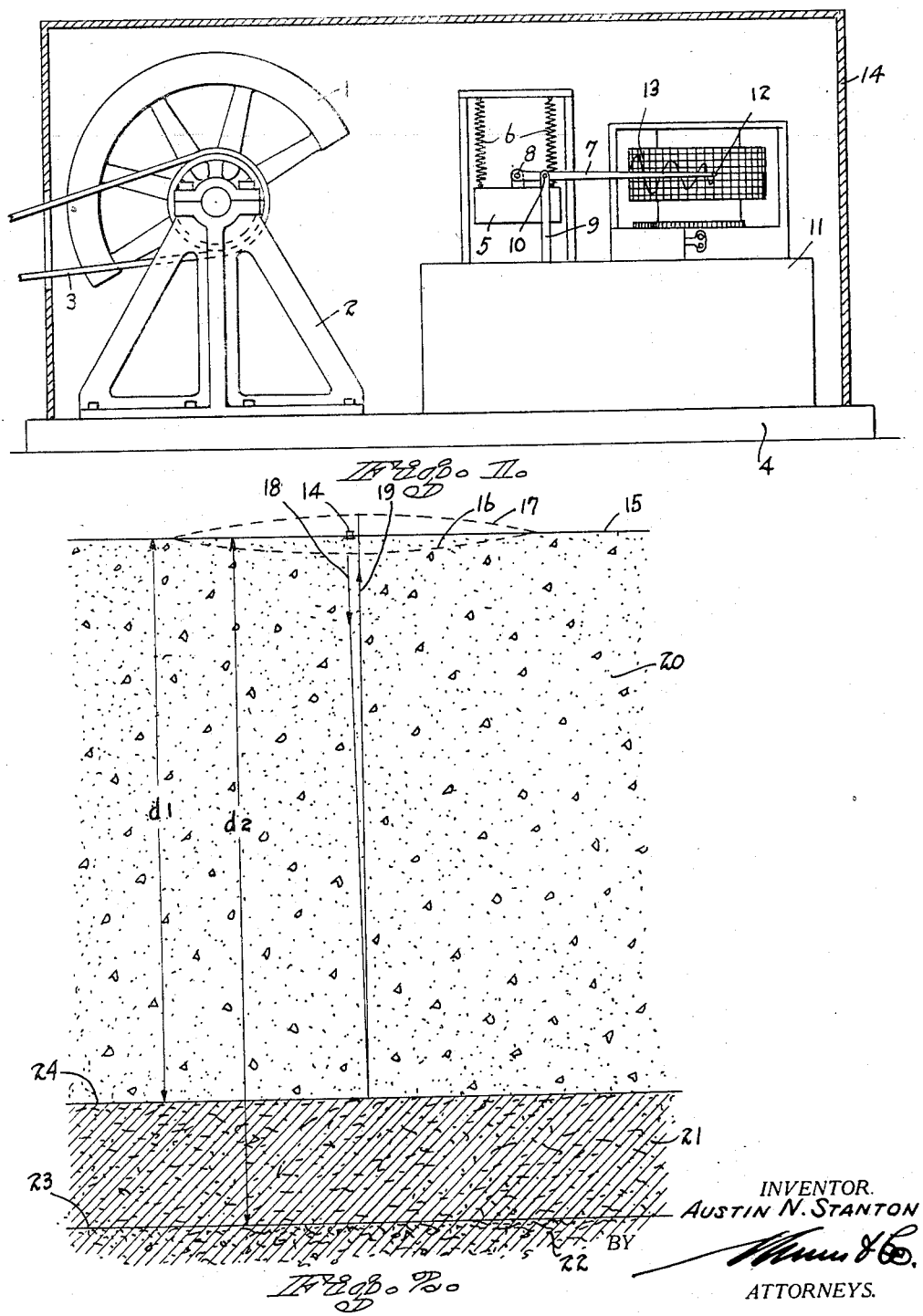
INVENTOR.
AUSTIN N. STANTON
BY
ATTORNEYS.

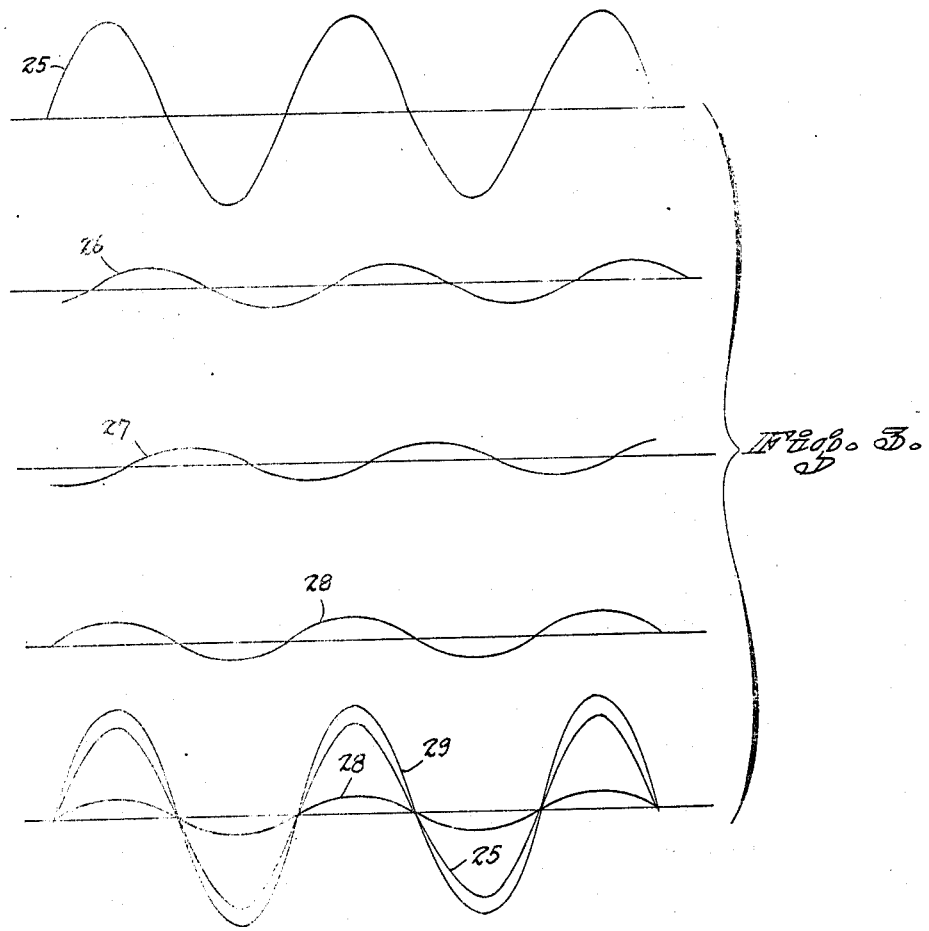

Patented Jan. 27, 1931

1,790,080

UNITED STATES PATENT OFFICE

AUSTIN N. STANTON, OF IOWA CITY, IOWA

METHOD OF SEISMOLOGICAL RESEARCH

Application filed December 26, 1928. Serial No. 328,400.

My invention relates to improvements in a method of seismological research, and it consists in the steps hereinafter described.

Seismological exploration has been used for several years in studying geological structures under ground with a view, principally, toward obtaining oil from these or adjacent structures. The torsion balance and the magnetometer, and recently, the radio depth finder are extensively used.

The old seismograph methods record the time required for a shock originating with the explosion of a quantity of dynamite to reach a distant point, from several yards up to ten miles or more, depending on the characteristics of the sound-path it is desired to cover. One type of work involves recording waves reflected from an interface between two layers, and in this case the distance between the shot and the recorder is approximately equal to the depth.

It will be noted that these are impulse waves, not continuous waves. In these records, frequency does not enter into the calculations, it enters only as regards selective treatment by the apparatus and some earth materials, since some frequencies are amplified more than others in certain electrical and mechanical amplifiers and some are absorbed by certain earth materials.

Outside seismic disturbances sometimes make determinations impossible by the old method because they make an impression on the record which resembles the artificial waves, and lead to erroneous results.

My new method calculates the depth directly from the frequency. Outside disturbances, unless periodic and of a frequency very near that generated by the geo-oscillator (a device used with my method) or a small multiple of this frequency, will in no wise affect the operation or the accuracy of this method.

The method involves a device which I will call a geo-oscillator to create, periodically, a strong pressure on the surface of the earth, the frequency of which can be varied from time to time; and a resonance indicator which records the consequent movement of the earth's surface at the same or a nearby point. Pressure waves set up by the geo-oscillator travel downwardly until reflected, totally or in part, by a change in the density of the structure.

Returning to the surface, the waves will modify the present surface movement. According to the well known simple theory of the closed organ pipe, if the depth is one-fourth the wave length of the exciting wave, resonance will occur, and the returning wave will strengthen the surface movement. This condition is to be regarded as a definite indication of a change of density as between two layers.

Since the depth is to be determined, the frequency must be varied and the amplitude measured for each frequency. A marked increase of amplitude will mark a frequency associated with a determinable depth.

The accompanying drawing shows one form of a geo-oscillator and a resonance indicator.

Figure 1 shows the geo-oscillator and the resonance indicator as being mounted upon a common base;

Figure 2 shows a single view through a portion of the earth, and illustrates how the pressure waves travel through the different strata; and Figure 3 is a diagram showing possible phase relations of the various waves and how increased amplitude is obtained when the returning wave is in phase with the surface movement.

In carrying out my invention, I make use of a geo-oscillator that comprises a large flywheel 1, half of which is removed, this flywheel being mounted upon a suitable support 2. The flywheel is rotated in a vertical plane by a suitable power device not shown. A belt 3 connects the power device with the flywheel. The geo-oscillator is mounted upon a base 4.

The resonance indicator is an insensitive mechanical seismograph which will accurately record large amplitudes. The resonance indicator has a large weight 5 suspended from long springs 6 so that it will maintain its position regardless of the motion of the supports. A very light arm 7 is pivoted on the weight at 8 and on a rigid post 9 at 10. The post is carried by a base 11.

A stylus 12 disposed at the outer end of the arm 7 records the vertical motion of the weight 5 upon a graph paper 13. The latter is mounted upon a drum which is slowly turned by clock mechanism (not shown) so as to draw the graph paper slowly and uniformly past the stylus. A speed indicator and a clock could be associated with the mechanism rotating the drum carrying the graph paper so as to give a simultaneous and continuous record of the speed and also give the time.

In Figure 2 I show a section through a portion of the earth's surface. Figure 1 shows the geo-oscillator and resonance indicator as being mounted in a casing 14, and this casing is shown greatly reduced in Figure 2, and as resting upon the surface 15 of the earth. As the rotor of the geo-oscillator revolves, there will be a vertical component of force directed toward the center of the earth. This is indicated by the equation:

$$F = W + C\omega \sin \omega t$$

where $\omega$ is the angular velocity in radians per second. (A radian is a natural unit of angle being an angle such that the arc is equal to the radius—about 57°.) That is, a periodic force will be exerted upon the earth's surface in addition to the normal force due to the weight of the device.

The displacement of the surface then will be:

$$h = \omega k \sin \omega t$$

neglecting the effect of the weight which is constant. The resonance indicator will record the vibration of this wave as a simple sine wave on the chart. The constant $k$ expresses the proportionality of the two sides of the equation if actual data is substituted for the rest of the terms.

It is, of course, assumed that the earth is an ideally elastic body so that the displacement is proportional to the force, and since the periodic force is proportional to the angular velocity, the displacement will also be proportional. In cases where the displacement becomes too large, a lighter rotor must be used.

As already stated, the functioning of the geo-oscillator will alternately depress and raise the surface 15. This is indicated by the dotted lines 16 and 17 in Figure 2. The compression indicated by the dotted line 16 will travel in all directions, but in the present case I am concerned only with the beam which travels downwardly and which is eventually returned to the resonance indicator. The downwardly-traveling beam is indicated by the arrow line 18, and the upwardly-traveling beam by the arrow line 19.

The necessary condition for a reflection of the downwardly-traveling beam is a change in the density of the medium. The greater and more sudden the change of density, the larger the portion of the energy reflected. It will be seen, therefore, that energy will be reflected when it strikes the surface between a soft layer such as clay and a hard layer such as granite or sandstone. The energy so reflected returns to the surface and modifies the displacement present at the instant of the return.

In Figure 2 the layer 20 indicates the soft material composing the first thousand feet or so of the earth's crust. Beneath this I show a hard underlying stratum 21, and beneath this stratum I show a second stratum 22 which is of a different density.

The wave indicated by the line 18 will travel downwardly to the surface of the stratum 21, and at this point a portion of the energy will be reflected and will return to the resonance indicator along the line 19. A portion of the energy which passes through stratum 21 will be reflected from line 23 and returned to the surface, arriving later than that wave which is returned from the line 24, since it had farther to travel. Each of these waves will produce a displacement of the surface, the total displacement of which is set forth in the following formula:

$$h = \omega k \sin \omega t + k_1 \omega \sin \omega\left(t - \frac{2d_1}{v_1}\right) + k_2 \omega \sin \omega\left(t - \frac{2d_2}{v_2}\right).$$

Additional terms may be added for additional lines. $t$ is reckoned from any time at which the position of rest is assumed by the surface, while $v_1$ and $v_2$ are average velocities such that $d_1 = v_1 t_1$ and $d_2 = v_2 t_2$ where $t_1$ and $t_2$ are the times required for the wave to transverse the distance $d_1$ and $d_2$ respectively. The terms $k_1$ and $k_2$ etc. are proportional factors, and these are to be determined by experiment and depend upon the elasticity and absorption characteristics of the soil and strata. It will therefore be seen that the formula takes into account the fact that the velocity changes with the depth and with the different types of structures.

It will be necessary to experiment from known depths to determine the terms $v_1$ and $v_2$. The record shown by the resonance indicator will be the resultant displacement caused by the sum of all of the separate waves.

In Figure 3 I show these various waves. The wave indicated as 25 shows the displacement directly due to the geo-oscillator. The wave returning from line 24 (Figure 2) is indicated as 26 in Figure 3, and the wave returning from line 23 in Figure 2 is indicated as 27 in Figure 3. It will be noted that all of these waves have the same frequency but are out of phase.

If the frequency is such that $$d_1 = \frac{\lambda}{4} = \frac{v}{4f}$$

where $f$ is the frequency then substituting in the next to the last formula we have the following formula:

$$h = \omega k \sin \omega t + \omega k_1 \sin \omega\left(t - \frac{T}{2}\right) + \omega k_2 \sin \omega\left(t - \frac{2d_2}{v_2}\right).$$

From this it will be seen that the wave returning from stratum 21 is $$\frac{T}{2}$$

seconds behind the motion of the surface, but since it has suffered reflection, it is in phase with the surface motion where $$T = \frac{1}{f}.$$

The wave now returning from line 24, Figure 2, is indicated by 28. Note that it is in phase with 25. The wave indicated by 27 changes the wave form of the surface motion, but does not markedly increase the amplitude. The wave indicated by 29 shows the total motion of the surface by adding all points of 25 and 28 without regard to 27. This is the condition known as resonance. Since the returning wave is in phase and is of the same frequency as the surface movement, it need now only overcome the viscosity, and not the elasticity of the earth materials, the resulting increase of amplitude may be greatly amplified. Resonance is to be considered the strongest indication of reflection from subterranean strata. Wave 28, Figure 3, is simply wave 26 which has been shifted into phase by the change of frequency to make $$\frac{v}{4f} = d_1.$$

From the foregoing description of the various parts of the device, the operation thereof may be readily understood.

The flywheel 1 will be revolved and the graph paper 13 will be moved past the stylus 12 at a uniform speed. The wheel 1 is preferably revolved at its slowest working speed, say at .17 R. P. M., and uniformly increased until the amplitude becomes too large for satisfactory results. A lighter wheel corresponding to the wheel 1 may now be substituted and the process continued until the upper limit of say 2.5 R. P. M. is reached.

In any given territory it is possible that one flywheel 1 will be sufficient because the depth to the desired strata varies between relatively narrow limits. The record made by the stylus on the graph paper 13 comprises the complete data. If any part of this data is held in doubt, the entire operation may be repeated as many times as desired.

The purpose of the invention, of course, is to find changes in elevation of a particular structure lying near the strata supposed to contain oil. A large group of readings at intervals over a given territory will be sufficient to map the subterranean contours.

Although I have shown and described one embodiment of my invention, it is to be understood that the same is susceptible of various changes, and I reserve the right to employ such changes as may come within the scope of the invention as claimed.

I claim:

1. The method of determining the depth of a subterranean stratum which consists in creating periodical pressure waves and sending them down into the ground, and in increasing the frequency of the waves until the waves reflected back from the stratum are in resonance with the exciting wave.

2. The method of determining the depth and contour of a subterranean stratum which consists in creating periodical pressure waves and sending them down into the ground, and in increasing the frequency of the waves until the waves reflected back from the stratum are in resonance with the exciting wave, and in repeating the operation at different places on the surface.

3. The method of determining the contour of a subterranean stratum which consists in slowly moving a weight for creating periodic pressures on the earth's surface, in increasing the movement for increasing the frequency, and in graphing the modified wave caused by the combining of the exciting wave and the reflected wave.

4. A device for determining the depth and contour of an underlying stratum comprising means for periodically applying pressure to the earth's surface for causing pressure waves to travel down in the earth, and means for graphing the vibrations of the surface caused by the combining of the exciting and reflected waves.

5. In a device for determining the depth and contour of an underlying stratum, means for creating pressure waves, comprising a bearing element, having, a large base and means nonsymmetrical with the bearing element and adapted to be rotated on said bearing for creating pressure waves in said base.

6. A system for creating periodic pressure waves and recording the reflections thereof from a reflecting medium, comprising a mass having a nonsymmetrical axis, means for rotatably supporting said mass along said axis and means for rotating said mass, in combination with seismic recording means for recording the reflected pressure wave generated by said rotating means.

7. A device for determining the depth and contour of an underlying stratum, comprising means for periodically applying pressure to the earth's surface for causing pressure waves to travel down in the earth, and means for recording the reflected compressional waves including a base common to both means.

AUSTIN N. STANTON.